United States Patent
Kalamkar et al.

(10) Patent No.: US 12,547,933 B2
(45) Date of Patent: Feb. 10, 2026

(54) METRICS-BASED ON-DEMAND ANOMALY DETECTION

(71) Applicant: Intuit Inc., Mountain View, CA (US)

(72) Inventors: Amit Shriram Kalamkar, Fremont, CA (US); Vigith Maurice, Chicago, IL (US); Avik Basu, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 1140 days.

(21) Appl. No.: 17/515,377

(22) Filed: Oct. 29, 2021

(65) Prior Publication Data

US 2023/0132670 A1   May 4, 2023

(51) Int. Cl.
   *G06N 20/00* (2019.01)
   *G06N 20/20* (2019.01)

(52) U.S. Cl.
   CPC ............. *G06N 20/00* (2019.01); *G06N 20/20* (2019.01)

(58) Field of Classification Search
   CPC ........... G06N 20/00; G06N 20/20; G06N 5/00
   See application file for complete search history.

(56) References Cited

U.S. PATENT DOCUMENTS

| | | | |
|---|---|---|---|
| 10,685,293 B1* | 6/2020 | Heimann | H04L 63/1425 |
| 11,663,067 B2* | 5/2023 | Anghel | G06N 3/045 |
| | | | 706/21 |
| 12,265,446 B1* | 4/2025 | Callot | G06N 20/20 |
| 2013/0041644 A1* | 2/2013 | Cremonesi | G06N 5/047 |
| | | | 703/13 |
| 2019/0370610 A1* | 12/2019 | Batoukov | G06F 11/0709 |
| 2020/0336503 A1* | 10/2020 | Xu | G06F 11/0772 |
| 2021/0390378 A1* | 12/2021 | Ono | G06N 3/047 |
| 2022/0060430 A1* | 2/2022 | Milton | G06Q 20/227 |
| 2022/0334904 A1* | 10/2022 | Chesneau | G06F 11/0793 |
| 2023/0004832 A1* | 1/2023 | Sahasi | H04L 67/306 |
| 2023/0036917 A1* | 2/2023 | Meschiari | G06N 20/00 |

* cited by examiner

Primary Examiner — Mariela Reyes
(74) Attorney, Agent, or Firm — Lathrop GPM LLP

(57) ABSTRACT

A method for metrics-based anomaly detection involves receiving an anomaly analysis request for an asset and obtaining metrics associated with the asset. Each of the metrics includes time series data. The method further involves detecting that one of the metrics is a counter. The detection involves seasonally differencing the metric, obtaining a regression line by performing a linear regression on the metric, and determining that an angle of the regression line exceeds a predetermined threshold angle. The method also involves training models for the metrics, the training including training a counter-specific model for the metric that is a counter. The method further involves determining, using the models after the training, at least one metric that is anomalous.

20 Claims, 7 Drawing Sheets

METRICS-BASED ON-DEMAND ANOMALY DETECTION

BACKGROUND

Large scale systems may generate enormous amounts of operational data. Such systems may fail and falter from time to time. When that happens, engineers may rush to locate the cause of the failure, and subsequently act on it. Reducing the mean time to repair (MTTR) is desirable. One aspect of reducing the MTTR is the prompt identification of the likely cause of the failure.

SUMMARY

In general, in one aspect, one or more embodiments relate to a method for metrics-based anomaly detection, the method comprising: receiving a first anomaly analysis request for an asset; obtaining a plurality of metrics associated with the asset, wherein each of the plurality of metrics comprises time series data; detecting that one of the plurality of metrics is a counter, the detection comprising: seasonally differencing the metric; obtaining a regression line by performing a linear regression on the metric; and determining that an angle of the regression line exceeds a predetermined threshold angle; training a plurality of models for the plurality of metrics, the training comprising: training a counter-specific model for the metric that is a counter; and determining, using the models after the training, a first at least one metric that is anomalous, in the plurality of metrics.

In general, in one aspect, one or more embodiments relate to a method for metrics-based anomaly detection, the method comprising: receiving an anomaly analysis request for an asset; obtaining a plurality of metrics associated with the asset, wherein each of the plurality of metrics comprises time series data; identifying, using a plurality of models for the plurality of metrics, a first metric that is anomalous, in the plurality of metrics, comprising: determining, for each of the plurality of metrics, an anomaly threshold; performing, for each of the plurality of metrics, a forecast using the model corresponding to the metric; computing, for each of the plurality of metrics, using the anomaly threshold and a forecast error between the forecast and the metric, an anomaly score; and detecting a first anomaly in the first of the plurality of metrics, based on a change in the anomaly score associated with the first of the plurality of metrics.

In general, in one aspect, one or more embodiments relate to a system for metrics-based anomaly detection, the system comprising: a computer processor; and an anomaly detection module executing on the computer processor configured to: receive an anomaly analysis request for an asset; obtain a plurality of metrics associated with the asset, wherein each of the plurality of metrics comprises time series data; identify, using a plurality of models for the plurality of metrics, a first metric that is anomalous, in the plurality of metrics, comprising: determine, for each of the plurality of metrics, an anomaly threshold; perform, for each of the plurality of metrics, a forecast using the model corresponding to the metric; compute, for each of the plurality of metrics, using the anomaly threshold and a forecast error between the forecast and the metric, an anomaly score; and detect a first anomaly in the first of the plurality of metrics, based on a change in the anomaly score associated with the first of the plurality of metrics.

Other aspects of the invention will be apparent from the following description and the appended claims.

DETAILED DESCRIPTION

Figure 1:
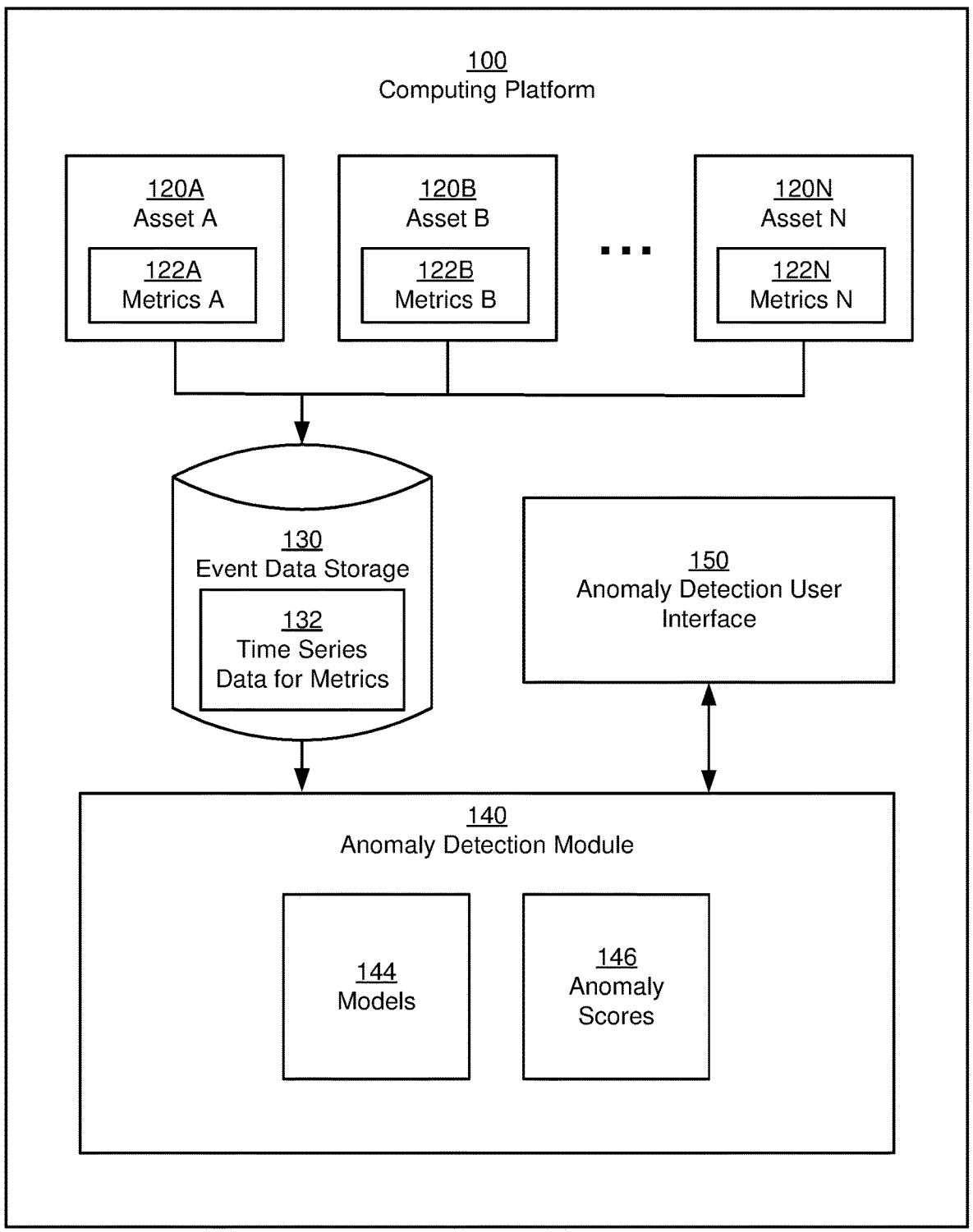
FIG. 1 shows a computing platform, in accordance with one or more embodiments of the disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

Embodiments of the disclosure enable a metrics-based on-demand anomaly detection. A system, e.g., a computing platform may include many assets, e.g., hardware components, software services such as database services, data processing services, and/or many other types of services, etc. Each of these assets may fail or show an unexpected behavior, at some point in time. The metrics-based on-demand anomaly detection may, upon request by a user (e.g., and administrator) evaluate many operational metrics associated with an asset that the user chooses to analyze, e.g., in response to detecting that the asset has failed or is showing unexpected behavior. The metrics-based on-demand anomaly detection, in one or more embodiments, identifies metrics that are anomalous. The identification may be performed by models that are specific to the metrics. The models may be used to forecast the metrics. A comparison of the forecasted metrics and the actually observed metrics may reveal discrepancies which may be indicative of anomalies. Such detected anomalies may be brought to the user's attention and may enable the user to isolate the cause of the failure or unexpected behavior. Because metrics may change over time, the on-demand anomaly detection may also involve an on-demand training of the models being used for the forecasting of the metrics. A detailed description is subsequently provided in reference to the figures.

Turning to FIG. 1, a computing platform (100), in accordance with one or more embodiments, is shown. The computing platform (100) may be based on a computing system as described in reference to FIGS. 7A and 7B, or it may be based on multiple or many computing systems. The computing platform (100) may include any number of assets (120A-120N). An asset may be any type of asset and may include software and/or hardware components. For example, a hardware-type asset may be a hard drive or a processor. A service-type asset may be, for example, a software service, a storage service, a platform service, a data analysis service, etc. Each of the assets (120A-120N) may provide operational data for certain metrics (122A-122N) documenting the operation of the asset. A metric associated with an asset is a singular type of data that may be considered relevant to the operation of the asset. A metric may be for network communications by a service, CPU usage, database access operations, or for any other aspect of the operation of a service. Specific examples for metrics are gateway metrics, prometheus metrics, and aws metrics. For a hardware-type asset, a metric may be for temperature, power consumption, or any other operational variable associated with the asset. Many metrics may be associated with a single asset, and different metrics may be associated with different assets. Whenever a particular asset performs a particular operation, a time-stamped event may be generated for the metric. The time-stamped events may be stored in an event storage (130). In combination, the time-stamped events associated with a particular metric form time series data for the metric. The event storage (130), in one or more embodiments, thus stores time-stamped events for metrics (132). The event storage may store all or at least some of the events associated with the metrics (122A-122N). The event storage (130) may be any type of data storage, for example, a real-time analytics database such as Apache Druid.

In one or more embodiments, the computing platform (100) includes an anomaly detection module (140). The anomaly detection module, in one or more embodiments, operates on the time series data for the metrics (132) stored in the event data storage (130). The anomaly detection module (140) may be invoked upon request, e.g., by a user via the anomaly detection user interface (150). In one or more embodiments, the anomaly detection module (140) performs a metrics-based on-demand anomaly detection. In one or more embodiments, the anomaly detection involves the use of models (144) used to perform forecasts. A model may be an additive regressive model, which may be easy to train, and which may handle seasonality in the time series data very well. Any other type of model may be used without departing from the disclosure. In one or more embodiments, a model is specific to a metric. Accordingly, a separate model may be used for each of the metrics, and a specific set of models (144) may be used for each of the assets (120A-120N). A model may operate on time series data for one metric to forecast the metric. A model may require training, prior to application of the model to the time-series data. Trained models may be stored in any type of data storage, e.g., a DynamoDB table. An anomaly score (146) may be generated, using the model (144), once trained. Based on the anomaly score (146), the metric may or may not be considered anomalous. The anomaly detection module (140) may include instructions which may be stored on a computer-readable medium. The instructions may perform the operations described in reference to the flowcharts of FIG. 2, FIG. 3, FIG. 4, and FIG. 5.

The anomaly detection user interface (150) may be any type of user interface enabling a user to control the metrics-based on-demand anomaly detection performed by the anomaly detection module (140). The user interface may provide the user with control elements to initiate the anomaly detection for one or more of the assets (120A-120N), and may further include elements to provide the user with results of the anomaly detection, as further discussed below.

While FIG. 1 shows a configuration of components, other configurations may be used without departing from the scope of the disclosure. For example, various components may be combined to create a single component. As another example, the functionality performed by a single component may be performed by two or more components that may be communicatively connected using a network connection.

FIG. 2, FIG. 3, FIG. 4, and FIG. 5 show flowcharts in accordance with one or more embodiments. The flowcharts of FIG. 2, FIG. 3, FIG. 4, and FIG. 5 depict methods for metrics-based on-demand anomaly detection, in accordance with one or more embodiments. One or more of the steps in FIG. 2, FIG. 3, FIG. 4, and FIG. 5 may be performed by various components of the system, previously described in reference to FIG. 1.

While the various steps in these flowcharts are presented and described sequentially, one of ordinary skill will appreciate that some or all of the steps may be executed in different orders, may be combined or omitted, and some or all of the steps may be executed in parallel. Additional steps may further be performed. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention. Accordingly, the scope of the disclosure should not be considered limited to the specific arrangement of steps shown in FIG. 2, FIG. 3, FIG. 4, and FIG. 5.

Figure 2:
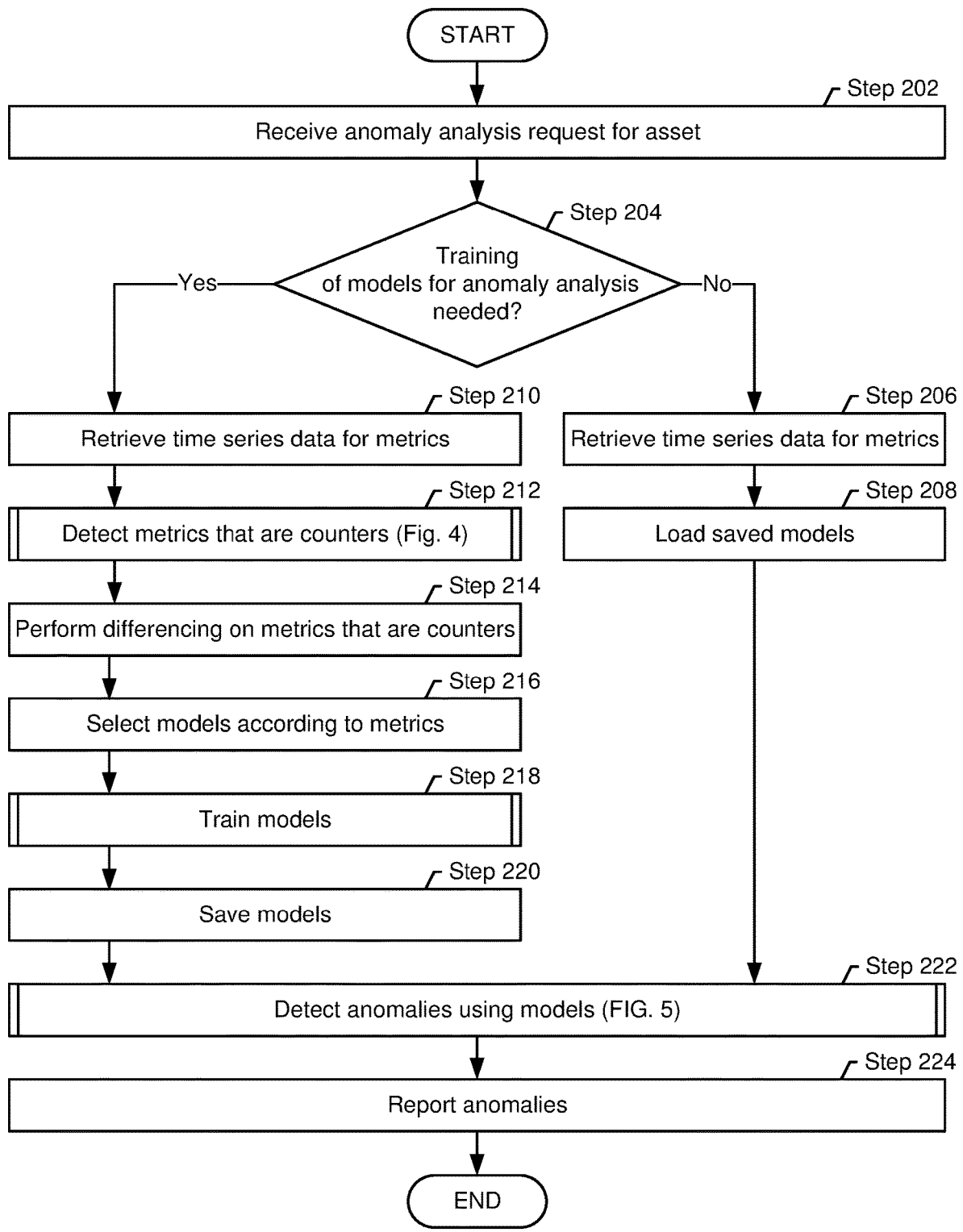
FIG. 2 shows a flowchart describing a method for metrics-based on-demand anomaly detection, in accordance with one or more embodiments of the disclosure.

Turning to the flowchart of FIG. 2, a method for metrics-based on-demand anomaly detection, in accordance with one or more embodiments of the disclosure, is shown.

In Step 202, an anomaly analysis request is received. The anomaly analysis request may specify a particular asset for which the anomaly analysis is to be performed. The anomaly analysis request may further specify parameters. The parameters may include but are not limited to a timeframe to be considered for the anomaly analysis, particular metrics to be considered, etc. If no particular timeframe is specified, a default timeframe may be used for the anomaly analysis. If no particular metrics are specified, a default set of metrics may be used for the anomaly analysis. The anomaly analysis request may be received from an anomaly detection user interface, e.g., when a user requests the anomaly analysis for the asset, and may trigger the execution of the subsequently described steps.

In Step 204, a determination is made about whether a training or re-training of the models to be used in conjunction with the asset is necessary. A training may be necessary if the models have not been previously trained. A re-training may be necessary if previously trained models are considered outdated, for example, when the previous training occurred more than 24 hours ago, because metrics may change over time, and/or because some metrics associated with an asset may disappear, while other metrics may be introduced. Any time thresholds may be used to determine whether previously trained models are considered outdated. A re-training may also be necessary for other reasons. For example, if the anomaly analysis request specifies a particular time frame and/or particular metrics for which models have not been trained, a training is necessary. If no training or re-training is necessary, the method may proceed with the execution of Step 206.

In Step 206, time series data for the metrics are retrieved. The time series data may be retrieved from the event data storage or from any other source. The metrics for which the time series data are retrieved are defined by the asset for which the anomaly analysis request is received, in Step 202. Alternatively or additionally, the anomaly analysis request may manually specify metrics which may be retrieved. The time interval for which the metrics are retrieved is selected to include the time series data needed to identify anomalies (Step 222). A detailed description of the time series data and the selected time interval is provided in reference to FIG. 6. As further discussed below (Steps 212), some metrics may be counters and some metrics may be gauges. If Step 206 involves the retrieval of metrics that are counters, a differencing may be performed to convert these metrics into gauge-type metrics (as discussed below, in Step 214).

In Step 208, the saved models are retrieved. A saved model may be a model that has been previously trained, e.g., by execution of Step 218, discussed below. The saved models that are retrieved are those associated with the time series data for the metrics retrieved in Step 206. The saved models may be retrieved from wherever they are stored, for example, from a DynamoDB table.

Returning to Step 204, if a training or re-training is necessary, the method may proceed with the execution of Step 210.

In Step 210, time series data for the metrics are retrieved. The time series data may be retrieved from the event data storage or from any other source. Step 210 may be equivalent to Step 206. However, the time interval for which the metrics are retrieved is selected to include the time series data needed to train the models (Step 218), and to identify anomalies (Step 222). A detailed description of the time series data and the selected time interval is provided in reference to FIG. 6.

In Step 212, a detection of metrics that are counters is performed. Broadly speaking, a metric may be a counter (which may generally increase) or a gauge (which may fluctuate). Gauges and counters may require different treatments, e.g., when performing the model training (Step 218). While for some metrics, it may be known whether the metric is a gauge or a counter (e.g., based on a labeling of the metrics), for some metrics it may be unknown whether the metrics are counters or gauges. A detailed description of the operations performed to distinguish metrics that are counters from metrics that are gauges is provided in reference to FIG. 4.

In Step 214, a differencing is performed on the metrics that are counters. By obtaining a first order derivative, a counter-type metric may be converted to a gauge-type metric. The differencing may enable the use of models that are suitable for gauge-type metrics. Without the differencing, such models may not be suitable for counter-type metrics.

In Step 216, models are selected according to the metrics. Models may be specific to metrics, and different types of models may be selected for different metrics. For example, a counter-specific model may be used for a metric that was found to be a counter. In one embodiment, a Prophet model is used for metrics that were found to be gauges. In one embodiment, an STL (Seasonal and Trend Decomposition using LOESS) model is used for metrics that were found to be counters and that have undergone differencing. While Prophet and STL models are specific types of models, other types of models may be used without departing from the disclosure.

In Step 218, the models are trained. Referring to the example of time series data associated with a metric (600) of FIG. 6, the training of the model may be performed for the time interval labeled "training data" In the example, the training data is for approximately six days (t−7 d t−22 h). Any other time interval may be used, without departing from the disclosure. The training may include a cross validation of the model evaluate the fit of the time series data. The type of training that is performed may be specific to the model that is being used. For example, a closed form solution may be obtained for a regression model. The training of other types of models may involve the use of a loss function. Any type of training approach may be used without departing from the disclosure.

In Step 220, the trained models are saved. Trained models may be stored in any type of data storage, e.g., in a DynamoDB table.

In Step 222, anomalies are detected using the models, after the training. A detailed description is provided in reference to FIG. 5. The results of the anomaly detection may be stored in a database. The database may be a cache, such as a Redis database cache, accessible for subsequent reporting.

In Step 224, the anomalies, if detected, are reported. The reporting may involve publishing the anomalies via a user interface. An anomalous metric may be reported by naming the anomalous metric in the user interface. Further, an anomaly score and/or a change in the anomaly score may be provided. Multiple anomalous metrics may be ranked to enable a user to recognize more vs less anomalous metrics. A detailed description of the anomaly scores, the change of the anomaly scores, and the ranking of anomaly scores is provided below in reference to FIG. 5.

Figure 3:
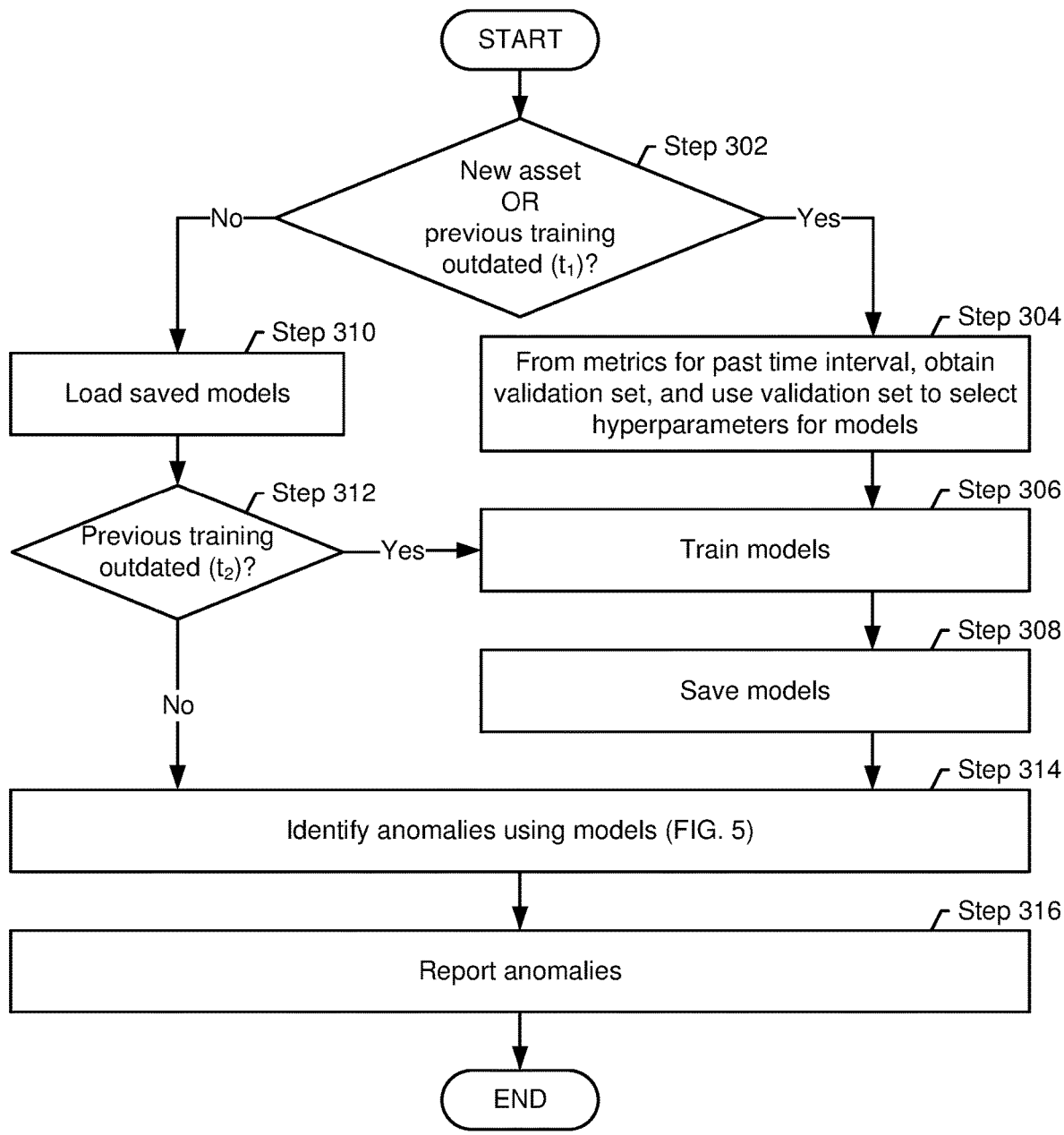
FIG. 3 shows a flowchart describing a method for metrics-based on-demand anomaly detection, in accordance with one or more embodiments of the disclosure.

Turning to the flowchart of FIG. 3, a flowchart describing a method for metrics-based on-demand anomaly detection, in accordance with one or more embodiments of the disclosure, is shown. While FIG. 3, analogous to FIG. 2, includes steps related to the metrics-base on-demand anomaly detection, additional details are provided, while other aspects are not shown. For example, FIG. 3 provides additional details on operations performed to determine whether a training or re-training of the models is necessary, while omitting other details such as the detection of metrics that are counters, etc.

Assume that an anomaly analysis request has been received, as described in Step 202 of FIG. 2

In Step 302, a first determination is made about whether a training or re-training of the models to be used in conjunction with the asset is necessary. The first determination is made based on the following considerations. If the asset is a new asset, a training of the models associated with the asset is necessary, and the execution of the method may proceed with Step 304. A re-training may further be necessary if the previous training is outdated. A training may be considered outdated if the last training was more than a specified time interval ago, i.e., the last training may have a first training expiration time which has expired. The first training expiration time may be, for example, 24 hours. In this case, the execution of the method may also proceed with Step 304.

By performing Steps 304 and 306, a full training may be completed, including an identification of hyperparameters of the models and a training of the models. Hyperparameters may include, for example, parameters for the modeling of a trend and/or a seasonality, etc., for models that are designed to capture seasonality. Models may have other hyperparameters, without departing from the disclosure. A training and validation may be performed for each of the models. The training and validation may be performed while varying the hyperparameters for the models. Specifically, the hyperparameters may be selected in Step 304, followed by the training and validation of the models in Step 306, using the hyperparameters selected in Step 304. Steps 304 and 306 may be repeatedly performed to determine a combination of appropriate hyperparameters resulting and trained models that provide a desirable performance. The cross validation performed to find the best hyperparameters to fit the model may use any type of metric, e.g., a root mean squared error. Referring to the example of time series data associated with a metric (600) of FIG. 6, the training of the model and the identification of the hyperparameters may be performed for the time interval labeled "training data" In the example, the training data is for approximately six days (t−7 d t−22 h). Any other time interval may be used, without departing from the disclosure.

In Step 308, the trained models are saved. Trained models may be stored in any type of data storage, e.g., in a DynamoDB table.

Returning to Step 302, if the asset is not new and the previous training is not outdated, the method may proceed with the execution of Step 310.

In Step 310, saved models associated with the asset are loaded. The models being loaded may have been obtained by a previous execution of Steps 304-308.

In Step 312, a second determination is made about whether a re-training of the models to be used in conjunction with the asset is necessary. A re-training may be necessary if the previous training is outdated. For the second determination, a training may be considered outdated if a time difference between the end of the last used training data and the start of the request window for which the anomaly analysis is to be performed (i.e., the time window t . . . t+2 h in FIG. 6) is greater than a second training expiration time. The training expiration time may be, for example, four hours. Any amount of time may be used for the second training expiration time, without departing from the disclosure. The second training expiration time may be selected based on an assumption that beyond this threshold, the time series data associated with the metrics may have changed significantly, thus necessitating a re-training. In this case, the execution of the method may proceed with Step 306, as previously described. The re-training may be performed using previously identified hyperparameters. Accordingly, the re-training does not involve the execution of Step 304. If the time difference has not been exceeded, the execution of the method may proceed with Step 314, without the re-training. A description of the various time windows used for training and validation is provided below in reference to FIG. 6.

In Step 314, anomalies are detected using the models. A detailed description is provided in reference to FIG. 5. The results of the anomaly detection may be stored in a database. The database may be a cache, such as a Redis database cache, accessible for subsequent reporting.

In Step 316, the anomalies, if detected, are reported. The reporting may involve publishing the anomalies via a user interface. An anomalous metric may be reported by naming the anomalous metric in the user interface. Further, an anomaly score may be provided. Multiple anomalous metrics may be ranked, according to the anomaly score to enable a user to recognize more vs less anomalous metrics. A detailed description of the anomaly scores and the ranking of anomaly scores is provided below in reference to FIG. 5.

Figure 4:
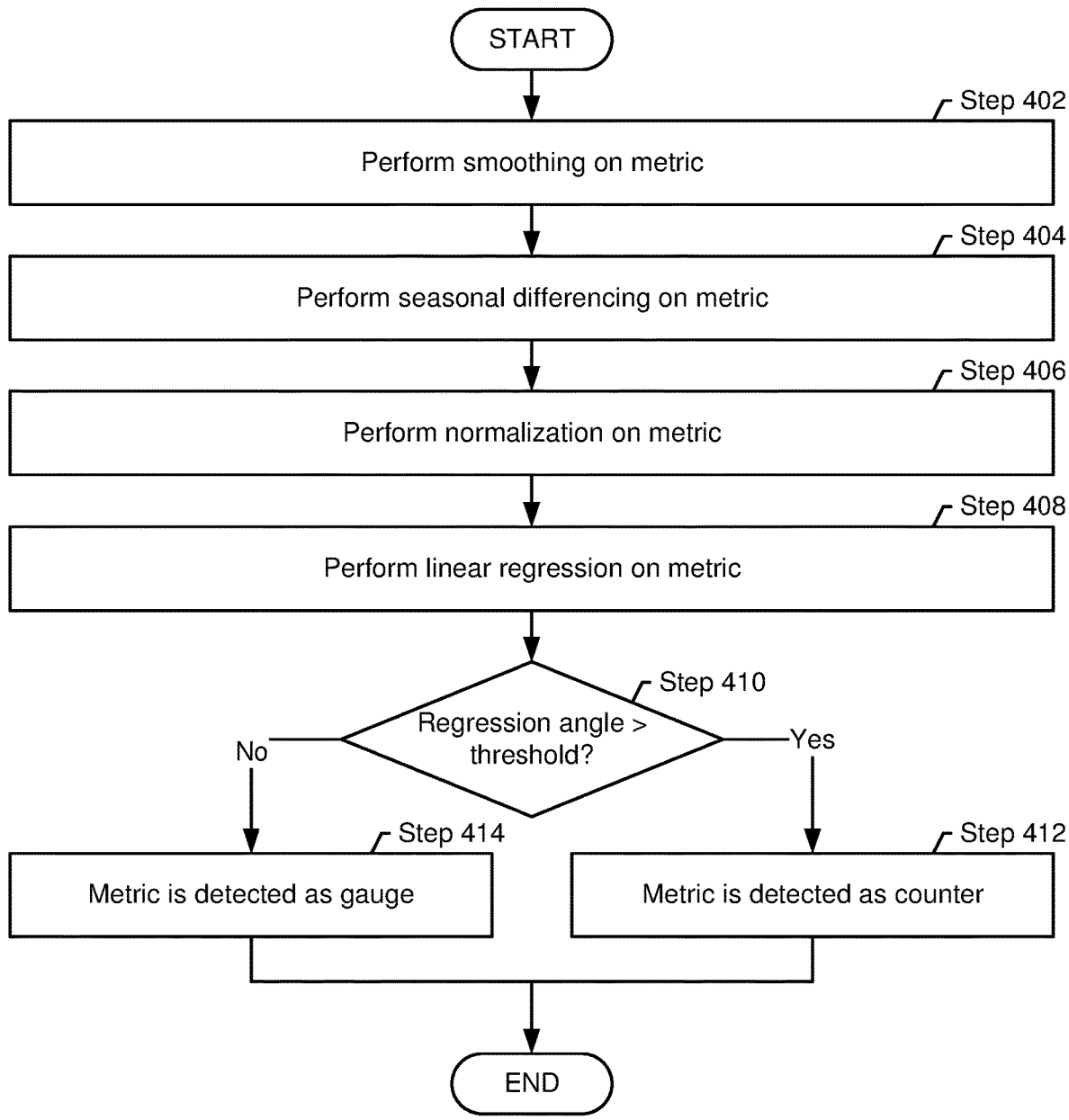
FIG. 4 shows a flowchart describing a method for detecting metrics that are counters, in accordance with one or more embodiments.

Turning to the flowchart of FIG. 4, a flowchart describing a method for detecting metrics that are counters, in accordance with one or more embodiments, is shown. The operations described in the flowchart may be repeated for each of the metrics to be evaluated for potentially being a counter.

In Step 402, a smoothing is performed on the metric. Any kind of kernel may be used for the convolution operation performing the smoothing.

In Step 404, a differencing is performed on the metric. In one or more embodiments, the differencing is a seasonal differencing to remove seasonality in the time series of the data. The seasonality may be removed, because it may be considered noise, for the purpose of the detection of metrics that are counters vs metrics that are gauges. The seasonality may be removed or at least reduced if the differencing is performed based on the periodicity of the seasonality. Assume, for example, a metric with a daily seasonality and one data value recorded per hour. In this case, the differencing would be performed, for example, between data values of Monday 12 pm and Tuesday 12 pm, between data values of Monday 1 pm and Tuesday 1 pm, etc.

In Step 406, a normalization is performed on the metric. The normalization may be a z-score normalization. In one or more embodiments, the normalization is performed for unit variance, but not for zero mean.

In Step 408, a linear regression is performed on the metric to obtain a regression line. In one or more embodiments, the linear regression is with a zero fit intercept, i.e., the regression line passes through the origin.

In Step 410, the angle of the regression line is assessed. The angle may express a deviation from a horizontal line. If the angle of the regression line is greater than a predetermined threshold angle, e.g., 2°, the metric is detected as a counter in Step 412. Otherwise, the metric is detected as a gauge in Step 414.

Figure 5:
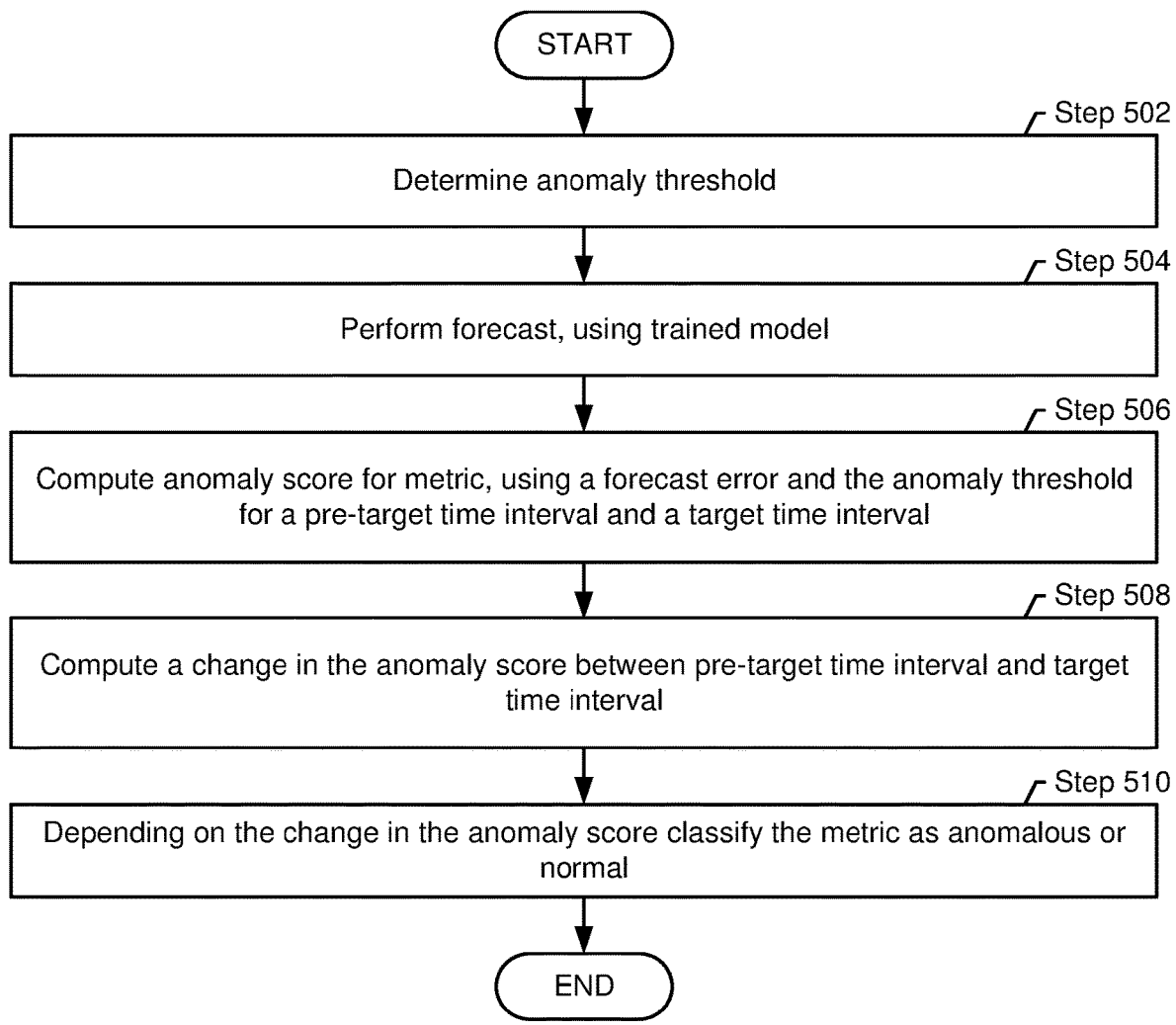
FIG. 5 shows a flowchart describing a method for identifying anomalies in the metrics, in accordance with one or more embodiments of the disclosure.

Turning to the flowchart of FIG. 5, a flowchart describing a method for identifying anomalies in the metrics, in accordance with one or more embodiments of the disclosure, is shown. The operations described in the flowchart may be repeated for each of the metrics to be evaluated for potentially being anomalous.

In Step 502, an anomaly threshold is determined for a particular metric. The anomaly threshold may later be used to determine whether the metric is anomalous or not, as discussed below. Referring to the example of time series data associated with a metric (600) of FIG. 6, the operations performed to obtain the anomaly threshold are subsequently described. Assume that a model has been trained using the training data indicated in FIG. 6. In the example, the training data is for approximately six days (t−7 d t−22 h). Any other time interval may be used, without departing from the disclosure. Using the trained model, residuals (i.e., a reconstruction error) is computed for the training data. Next, a mean and a standard deviation of the residuals may be calculated. The anomaly threshold may be set based on the standard deviation. For example, the anomaly threshold may be set to +/− three standard deviations. Any value may be used for the anomaly threshold, for example two standard deviations, four standard deviations, etc., without departing from the disclosure.

In Step 504, a forecast is performed, using the trained model. Referring to the example of time series data associated with a metric (600) of FIG. 6, the operations performed to obtain the forecast using the trained model are subsequently described. The forecast may be performed for the time interval labeled "test data". The time interval for the forecast may be one day (t−22 h t+2 h). Any other time interval may be selected, without departing from the disclosure.

In Step 506, an anomaly score is computed for the metric. Broadly speaking, the anomaly score may be based on a forecast error and the previously determined anomaly threshold. The details are subsequently provided in reference to FIG. 6.

In a first step, a forecast error is obtained for the time interval labeled "test data". The forecast error is the difference between the forecast by the model obtained in Step 504, and the actual test data. The forecast error may be represented by a forecast error vector which includes all forecast error values for the test data time interval.

In a second step, the forecast error vector may be divided by the corresponding anomaly threshold to obtain a raw anomaly score vector.

In a third step, the raw anomaly score vector may be normalized. In one or more embodiments, the normalization is performed using a hyperbolic tangent function. A normalization may be performed within a range of 0-10. Higher values suggest outliers. For example, a value between 0 and 1 may be considered an inlier, and values greater than 1 may be considered outliers. Values close to 10 may be considered extreme outliers.

As a result of the operations performed in the first, second, and third step, a vector with normalized anomaly scores may be available for all test data.

Figure 6:
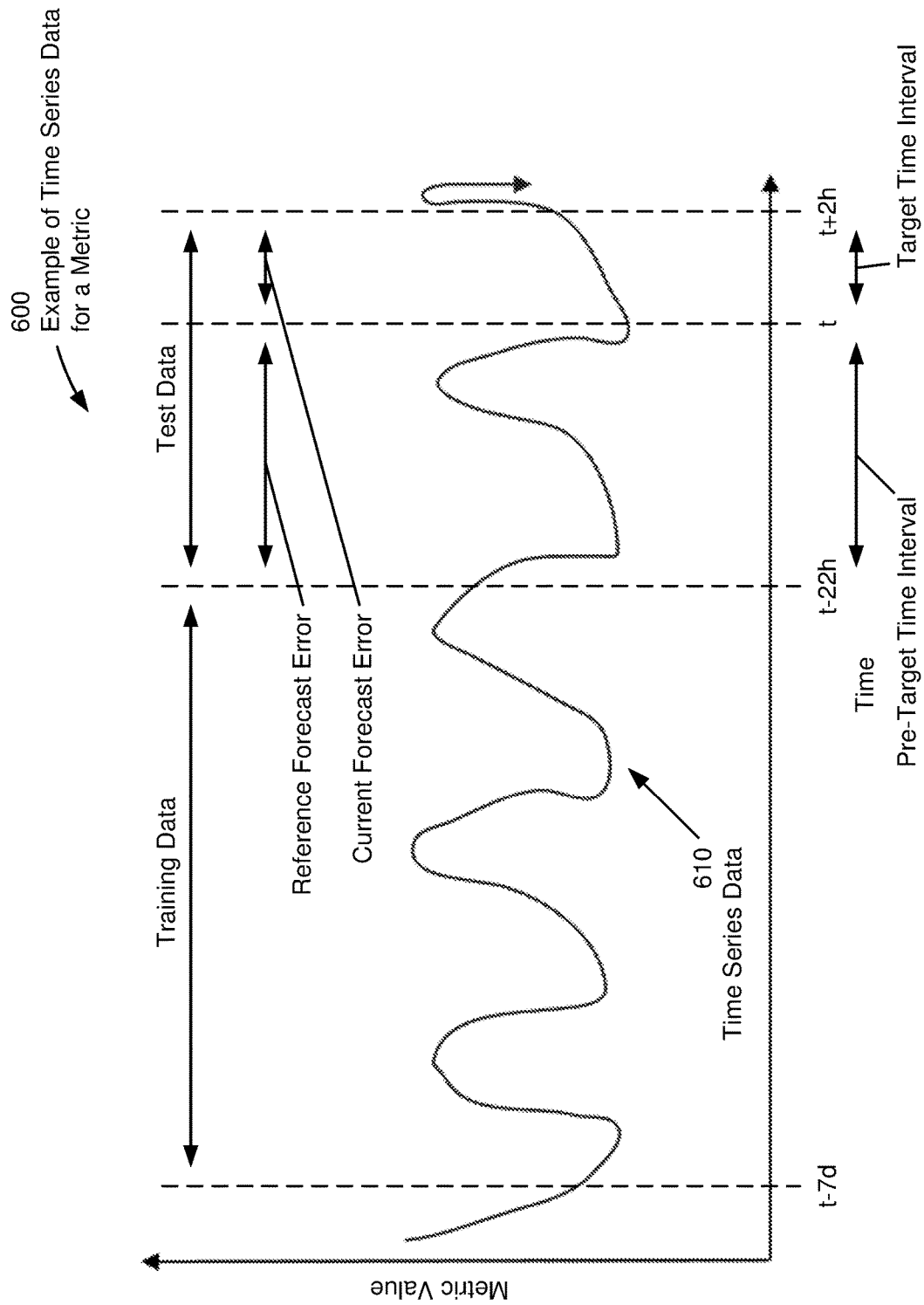
FIG. 6 shows an example of time series data for a metric, in accordance with one or more embodiments.

In a fourth step, the vector with the normalized anomaly scores is split between a pre-target time interval and a target time interval. In the example of FIG. 6, the pre-target time interval is 22 hours long, and the target time interval is two hours long. In one or more embodiments, the target time interval is the time interval for which the analysis for a possible anomaly is to be performed. In contrast, the pre-target time interval includes a reference forecast error which may serve to gauge the current forecast error. Specifically, for example, a high current forecast error in isolation may not be sufficient to assess whether the underlying metric is anomalous, e.g., in case of a metric that is poorly modeled, using the model. In this case, the reference forecast error would also be elevated. As a result, the metric may not be considered anomalous (false positive). In comparison, a high current forecast error and a low reference forecast error would suggest that the metric is anomalous (true positive). To distinguish false positives from true positives, a mean normalized anomaly score ("the anomaly score") is calculated from the vector with the normalized raw anomaly scores, separately for the pre-target time interval and for the target time interval.

Additional scores may be computed to provide further insights. For example, a Mean Arctangent Absolute Percentage Error (MAAPE) may be calculated for a given time window to quantify the error between the forecast data and the actual data. A Mean Directional Accuracy (MDA) may be calculated for a given time window to compare the direction in the forecast data to the direction in the actual data.

In Step 508, a change of the anomaly score between pre-target time interval and target time interval is calculated.

In Step 510, a classification of the metric may be performed, based on the change of the anomaly score. The metric may be classified as anomalous, if the change of the anomaly score exceeds a prespecified threshold. A larger increase in the anomaly score suggests a more significant anomaly in comparison to a smaller increase in the anomaly score. Further, once the steps of FIG. 5 have been performed for multiple metrics, the metrics may be ranked, based on the associated changes of the anomaly scores.

Turning to FIG. 6, an example (600) of time series data for a metric, in accordance with one or more embodiments, is shown. The example (600) includes time series data (610). In the example, the time series data (610) is for a duration of approximately seven days (t−7 d t+2 h). The time series data may have any temporal resolution, e.g., a one-minute resolution. For the purpose of the operations performed by the methods of FIGS. 2-5, the time series data (600) is segmented into training data and test data. Further, the test data is split into a pre-target time interval for determining a reference forecast error and a target time interval for determining a current forecast error. The use of these different time intervals is described in reference to FIGS. 2-5.

Various embodiments of the disclosure have one or more of the following advantages. Embodiments of the disclosure enable a metrics-based on-demand anomaly detection. Embodiments of the disclosure provide a clear, easy to interpret anomaly output. Anomalies may be ranked to enable a user to distinguish more severe anomalies from less severe anomalies. Embodiments of the disclosure use models that may be frequently updated and that are capable of handling seasonality. Embodiments of the disclosure are scalable to handle any type and any number of metrics. Metrics may be counters or gauges. Embodiments of the disclosure may be used to perform the anomaly detection at any temporal resolution.

Figure 7A:
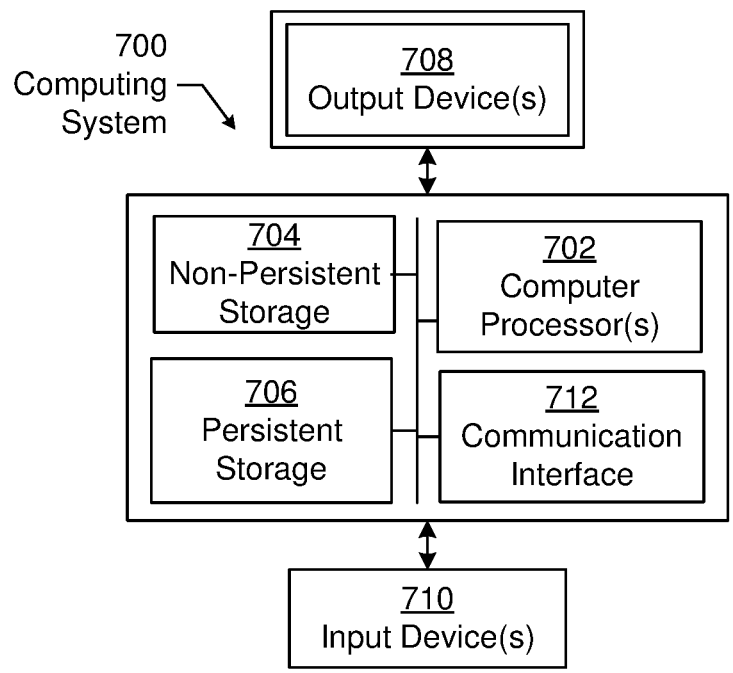
FIG. 7A and FIG. 7B show computing systems, in accordance with one or more embodiments of the disclosure.

Embodiments of the invention may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 7B:
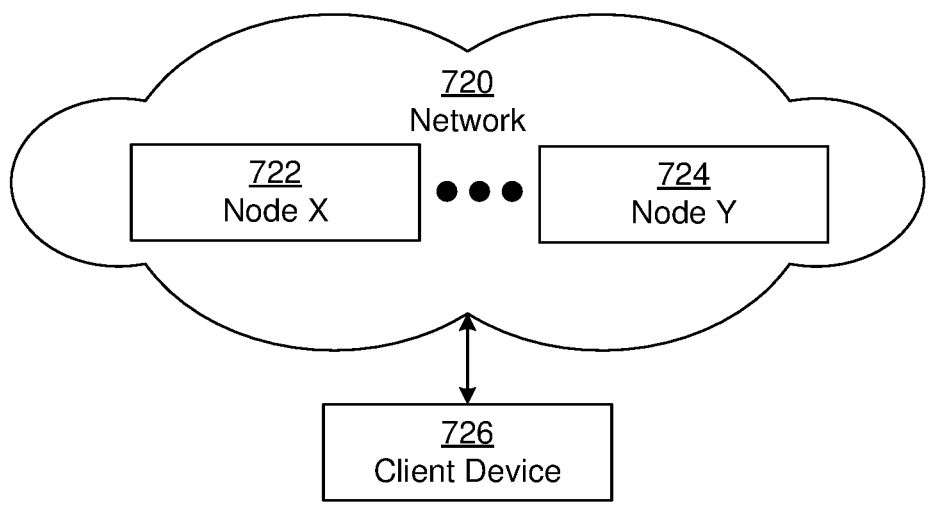

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the invention.

The computing system or group of computing systems described in FIG. 7A and FIG. 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7A and the nodes and/or client device in FIG. 7B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for metrics-based anomaly detection, the method comprising:
    receiving a first anomaly analysis request for an asset;
    obtaining a plurality of metrics associated with the asset,
        wherein each of the plurality of metrics comprises time series data, and
        wherein each of the plurality of metrics measure network communications of the asset;
    detecting that a given metric of the plurality of metrics is a counter, the detection comprising:
        seasonally differencing the given metric;
        obtaining a regression line by performing a linear regression on the given metric; and
        determining that an angle of the regression line exceeds a predetermined threshold angle;
    identifying combinations of hyperparameters in each of a plurality of models,
        wherein identifying the combinations comprises:
        obtaining, from metrics for past time intervals, validation sets, and
        using the validation sets to select the combinations of hyperparameters;
    training the plurality of models for the plurality of metrics, the training comprising:
        training a counter-specific model for the given metric,
        wherein training includes training the plurality of models using the combinations of hyperparameters;
    determining, using the models after the training, a first at least one metric that is anomalous, in the plurality of metrics, wherein the first at least one metric represents anomalous network communications;
    reducing a mean time to repair the network communications of the asset by presenting the first at least one metric; and
    repairing the network communications of the asset.

2. The method of claim 1, further comprising:
    receiving a second anomaly analysis request for the asset;
    based on determining that a re-training of the plurality of models is necessary:
        re-training the plurality of models; and
        determining, using the models after the re-training, a second at least one metric that is anomalous, in the plurality of metrics.

3. The method of claim 2,
    wherein determining that the re-training is necessary comprises:
        determining that training of the plurality of models is outdated, based on a first time threshold.

4. The method of claim 2, wherein determining that the re-training is necessary comprises:
    determining that the training of the plurality of models is not outdated, based on a first training expiration time; and
    determining that the training of the plurality of models is outdated, based on a second training expiration time, shorter than the first training expiration time.

5. The method of claim 1, wherein detecting further comprises:
    smoothing the given metric and normalizing the given metric, prior to seasonally differencing the given metric.

6. The method of claim 1, wherein seasonally differencing is performed based on a periodicity of a seasonality in the given metric.

7. The method of claim 1, wherein the linear regression is performed with a zero fit intercept.

8. A method for metrics-based anomaly detection, the method comprising:
    receiving an anomaly analysis request for an asset;
    obtaining a plurality of metrics associated with the asset,
        wherein each of the plurality of metrics comprises time series data, and
        wherein each of the plurality of metrics measure network communications of the asset;
    identifying, using a plurality of models for the plurality of metrics, a first metric that is anomalous, in the plurality of metrics, comprising:
        determining, for each of the plurality of metrics, an anomaly threshold;
        performing, for each of the plurality of metrics, a forecast using the model corresponding to the first metric;
        computing, for each of the plurality of metrics, using the anomaly threshold and a forecast error between the forecast and the first metric, an anomaly score; and
        detecting a first anomaly in the first of the plurality of metrics, based on a change in the anomaly score associated with the first of the plurality of metrics,
        wherein the first metric represents anomalous network communications, wherein the plurality of models are trained using combinations of hyperparameters for each of the plurality of models, and
wherein the combinations of hyperparameters are selected using validation sets obtained from metrics for past time intervals;
reducing a mean time to repair the network communications of the asset by presenting the first metric; and
repairing the network communications of the asset.

9. The method of claim 8, wherein determining the anomaly threshold comprises:
obtaining, using a model, selected from the plurality of models and associated with the first metric, a reconstruction error;
calculating a standard deviation of the reconstruction error; and
setting the anomaly threshold based on the standard deviation.

10. The method of claim 8, wherein detecting the first anomaly comprises:
computing a vector for the forecast error associated with the first of the plurality of metrics;
dividing the vector by the anomaly threshold associated with the first of the plurality of metrics;
splitting the vector between a pre-target time interval and a target time interval,
wherein the target time interval is for the metrics-based anomaly detection, and
wherein the pre-target time interval serves as a reference, prior to the target time interval;
computing a first anomaly score for the pre-target time interval of the vector and computing a second anomaly score for the target time interval of the vector; and
computing the change in the anomaly score between the first anomaly score and the second anomaly score.

11. The method of claim 10, further comprising:
normalizing the vector using a hyperbolic tangent function, prior to computing the first and the second anomaly scores.

12. The method of claim 8, further comprising:
detecting a second anomaly in a second of the plurality of metrics, based on the change in the anomaly score associated with the second of the plurality of metrics; and
ranking the second anomaly higher than the first anomaly, based on the change in the anomaly score associated with the second of the plurality of metrics being greater than the change in the anomaly score associated with the first of the plurality of metrics.

13. The method of claim 8, further comprising:
prior to identifying the first metric that is anomalous:
detecting that at least one of the metrics is a counter; and
differencing the first metric.

14. The method of claim 8, wherein one of the plurality of models is one selected from the group consisting of a Prophet model and a Seasonal and Trend Decomposition using LOESS model.

15. A system for metrics-based anomaly detection, the system comprising:
a computer processor; and
an anomaly detection module executing on the computer processor configured to:
receive an anomaly analysis request for an asset;
obtain a plurality of metrics associated with the asset,
wherein each of the plurality of metrics comprises time series data, and
wherein each of the plurality of metrics measure network communications of the asset;
identify, using a plurality of models for the plurality of metrics, a first metric that is anomalous, in the plurality of metrics, comprising:
determine, for each of the plurality of metrics, an anomaly threshold;
perform, for each of the plurality of metrics, a forecast using the model corresponding to the first metric,
wherein the first metric represents anomalous network communications,
wherein the plurality of models are trained using combinations of hyperparameters for each of the plurality of models, and
wherein the combinations of hyperparameters are selected using validation sets obtained from metrics for past time intervals;
compute, for each of the plurality of metrics, using the anomaly threshold and a forecast error between the forecast and the first metric, an anomaly score;
detect a first anomaly in the first of the plurality of metrics, based on a change in the anomaly score associated with the first of the plurality of metrics, wherein the first anomaly represents an anomalous network communication;
reduce a mean time to repair the network communications of the asset by presenting the first anomaly; and
repairing the network communications of the asset.

16. The system of claim 15, further comprising:
an event storage, wherein the plurality of metrics is obtained from the event storage.

17. The system of claim 15, further comprising:
an anomaly detection user interface configured to obtain the anomaly analysis request from a user.

18. The system of claim 17,
wherein the anomaly detection module is further configured to:
report the first anomaly to the user via the anomaly detection user interface.

19. The system of claim 15,
wherein the anomaly detection module is further configured to:
detect a second anomaly in a second of the plurality of metrics, based on the change in the anomaly score associated with the second of the plurality of metrics; and
rank the second anomaly higher than the first anomaly, based on the change in the anomaly score associated with the second of the plurality of metrics being greater than the change in the anomaly score associated with the first of the plurality of metrics.

20. The system of claim 15, wherein the anomaly detection module is further configured to, prior to identifying the first metric that is anomalous:
detect that at least one of the metrics is a counter; and
difference the first metric.

* * * * *